US008831763B1

(12) United States Patent
Sharifi et al.

(10) Patent No.: US 8,831,763 B1
(45) Date of Patent: Sep. 9, 2014

(54) INTELLIGENT INTEREST POINT PRUNING FOR AUDIO MATCHING

(75) Inventors: Matthew Sharifi, Zurich (CH); Gheorghe Postelnicu, Zurich (CH); George Tzanetakis, Victoria (CA); Dominik Roblek, Ruschlikon (CH)

(73) Assignee: Google Inc., Mountain View, CA (US)

( * ) Notice: Subject to any disclaimer, the term of this patent is extended or adjusted under 35 U.S.C. 154(b) by 205 days.

(21) Appl. No.: 13/276,316

(22) Filed: Oct. 18, 2011

(51) Int. Cl.
*G10L 15/20* (2006.01)
*G10L 15/02* (2006.01)

(52) U.S. Cl.
USPC .............. 700/94; 704/270; 704/243; 704/231

(58) Field of Classification Search
CPC ......... G10L 21/00; G10L 15/00; G10L 17/00; G10L 11/00; G10L 15/20; G10L 15/02; G06F 17/30
USPC ............................. 704/270, 243, 231; 700/94
See application file for complete search history.

(56) References Cited

U.S. PATENT DOCUMENTS 6,453,252 B1 9/2002 Laroche
6,721,488 B1 4/2004 Dimitrova et al.
7,516,074 B2 * 4/2009 Bilobrov ....................... 704/270
7,809,580 B2 10/2010 Hotho et al.
7,921,296 B2 * 4/2011 Haitsma et al. ............... 713/180
8,341,412 B2 * 12/2012 Conwell ....................... 713/176
2002/0023020 A1 2/2002 Kenyon et al.
2008/0201140 A1 * 8/2008 Wells et al. .................. 704/231
2009/0012638 A1 1/2009 Lou
2009/0265174 A9 * 10/2009 Wang et al. .................. 704/273

OTHER PUBLICATIONS

MusicBrainz—The Open Music Encyclopedia, http://musicbrainz.org, Last accessed Apr. 12, 2012.
Shazam, http://www.shazam.com, Last accessed Apr. 19, 2012.
Media Hedge, "Digital Fingerprinting," White Paper, Civolution and Gracenote, 2010, http://www.civolution.com/fileadmin/bestanden/white%20papers/Fingerprinting%20-%20by%20Civolution%20and%20Gracenote%20-%202010.pdf, Last accessed Jul. 11, 2012.
Milano, Dominic, "Content Control: Digital Watermarking and Fingerprinting," White Paper, Rhozet, a business unit of Harmonic Inc., http://www.rhozet.com/whitepapers/Fingerprinting_Watermarking.pdf, Last accessed Jul. 11, 2012.

* cited by examiner

*Primary Examiner* — Curtis Kuntz
*Assistant Examiner* — Thomas Maung
(74) *Attorney, Agent, or Firm* — Amin, Turocy & Watson, LLP

(57) ABSTRACT

System and methods for intelligently pruning interest points are disclosed herein. The systems include generating a plurality of distorted audio samples and associated distorted interest points based upon a clean audio sample. Interest points that are common to sets of distorted interest points are retained with interest points not robust to distortion discarded. The disclosed systems and methods therefore can provide for a scalable audio matching solution by eliminating interest points in reference sample fingerprints. The set of pruned interest points are robust to distortion and the benefits of both scalability and accuracy can be had.

22 Claims, 7 Drawing Sheets

INTELLIGENT INTEREST POINT PRUNING FOR AUDIO MATCHING

TECHNICAL FIELD

This application relates to audio matching, and more particularly to interest point pruning.

BACKGROUND

Audio samples can be recorded by many commercially available electronic devices such as smart phones, tablets, e-readers, computers, personal digital assistants, personal media players, etc. Audio matching provides for the identification of a recorded audio sample by comparing the audio sample to a set of reference samples. To make the comparison, an audio sample can be transformed to a time-frequency representation of the sample by using, for example, a short time Fourier transform (STFT). Using the time-frequency representation, interest points that characterize time and/or frequency locations of peaks or other distinct patterns of the spectrogram can then be extracted from the audio sample. Fingerprints or descriptors can then be computed as functions of sets of interest points. Fingerprints of the audio sample can then be compared to fingerprints of reference samples to determine identity of the audio sample.

It is desirable that an audio matching system contain interest points that are robust to the presence of noise, pitch shifting, time stretching, compression techniques, or other types of distortion in the audio sample that can prevent accurate identification of the audio sample. However, as fingerprints are computed as functions of sets of interest points, the more interest points present in a fingerprint, the less scalable the audio matching system becomes.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

Systems and methods disclosed herein relate to audio matching. A distortion component can generate a plurality of distorted audio samples based upon a clean audio sample and an intensity of distortion. An interest point detection component can generate a set of clean interest points based upon the clean audio sample and a plurality of sets of distorted interest points based upon the plurality of distorted audio samples. A merging component can determine amount of overlap based upon the clean interest points and the plurality of sets of distorted interested points. A pruning component can determine a set of pruned interest points based upon the amount of overlap and an overlap factor.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Figure 1:
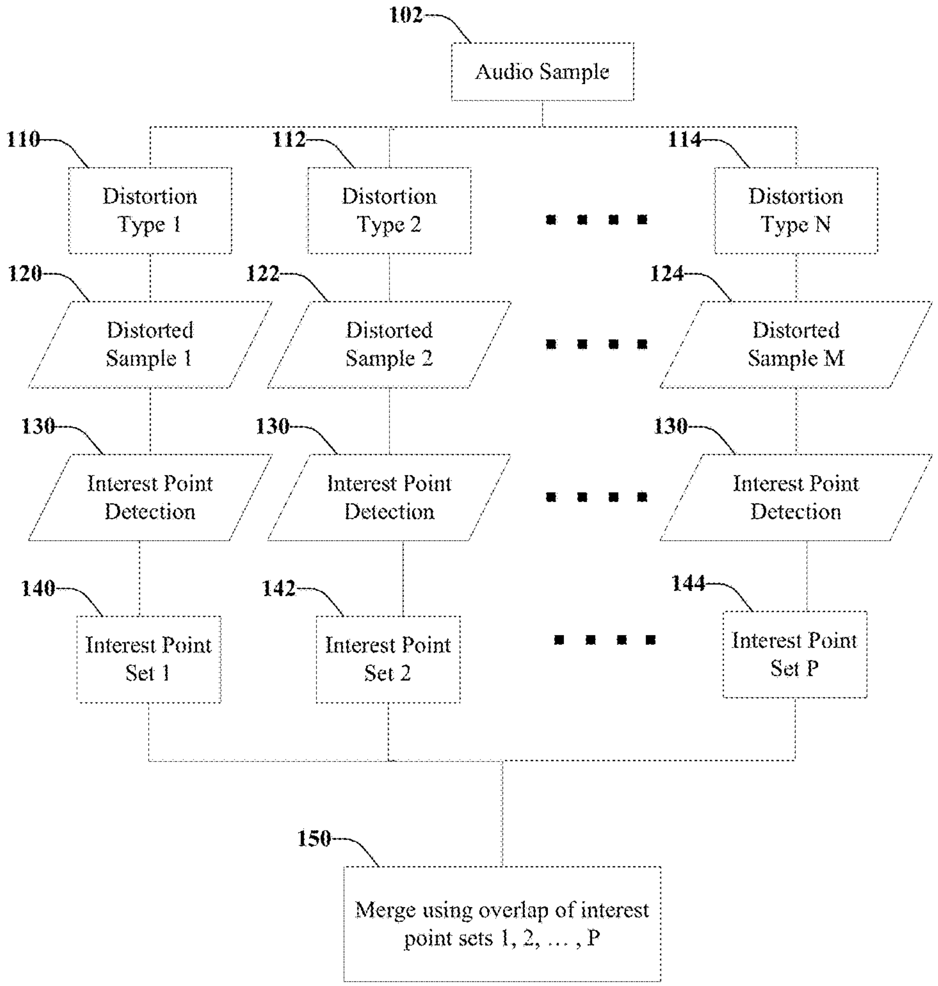
FIG. 1 illustrates a graphical block diagram example of intelligent interest point pruning.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

Audio matching in general involves analyzing an audio sample for unique characteristics that can be used in comparison to unique characteristics of reference samples to identify the audio sample. One way to identify unique characteristics of an audio sample is through the use of a spectrogram. A spectrogram represents an audio sample by plotting time on the horizontal axis and frequency on the vertical axis. Additionally, amplitude or intensity of a certain frequency at a certain time can also be incorporated into the spectrogram by using color or a third dimension.

There are several different techniques for creating a spectrogram. One technique involves using a series of band-pass filters that can filter an audio sample at a specific frequency and measure amplitude of the audio sample at that specific frequency over time. The audio sample can be run through additional filters to individually isolate a set of frequencies to measure amplitude of the set over time. A spectrogram can be created by combining all frequency measurements over time on a frequency axis which creates a spectrogram image of frequency amplitudes over time.

A second technique involves using short-time Fourier transform ("STFT") to break down an audio sample into time windows, where each window is Fourier transformed to calculate a magnitude of the frequency spectrum for the duration of each window. Combining a set of windows side by side on a time axis of the spectrogram creates an image of frequency amplitudes over time. Other techniques, such as wavelet transforms, can also be used to construct a spectrogram.

Creating and storing in a database an entire spectrogram for a set of reference samples can require large amounts of storage space and affect scalability of an audio matching system. Therefore, it is desirable to instead calculate and store compact descriptors ("fingerprints") of reference samples versus an entire spectrogram. One method of calculating fingerprints is to first calculate individual interest points that identify unique characteristics of local features of the time-frequency representation of the reference sample. Fingerprints can then be computed as functions of sets of interest points.

Calculating interest points involves identifying unique characteristics of the spectrogram. For example, an interest point can be a spectral peak of a specific frequency over a specific window of time. As another non-limiting example, an interest point can also include timing of onset of a note. Any suitable unique spectral event over a specific duration of time can constitute an interest point.

An audio matching system that includes reference fingerprints with many interest points will generally be more robust to distortion. For example, a set of clean interest points can be calculated for an audio sample lacking distortion. A separate set of distorted interest points can be calculated for the same audio sample suffering from various types of distortion. Depending on type or intensity of distortion in the second audio sample, it is unlikely that every interest point in the set of clean interest points will also be present in the set of distorted interest points. For example, a distorted sample may have spectral peaks that become less prominent or alternatively lose a spectral peak entirely as compared to a clean sample of the same audio. However, the distorted sample may retain the same spectral peaks as the clean sample of the same audio. Thus, only a subset of the clean interest points, in this example those relating to spectral peaks, may be present in the set of distorted interest points. Therefore, by including more interest points in a reference fingerprint, it is more likely that a subset of the clean interest points will be present in a set of distorted interest points.

While including more interest points in reference fingerprints generally makes those reference fingerprints more robust to distortion, it can also reduce scalability of a system. For example, because fingerprints are calculated as functions of sets of interest points, the size of a fingerprint can be dependent on the number of interest points contained in the fingerprint. Thus, it can be desirable to reduce the size of fingerprints by pruning interest points, while still retaining interest points robust to distortion.

Systems and methods herein provide for taking a clean audio sample and introducing the sample to various types of distortion. A separate set of interest points can then be calculated for each distorted variation of the audio sample. From the sets of distorted interest points, it can be determined which interest points are common to or overlap with the most sets of distorted points. Thus, the system can intelligently select specific interest points that are present in the most sets of distorted interest points while pruning those interest points that are less robust to distortion. To this end, a set of pruned interest points can be generated that increases scalability while retaining robustness to distortion.

Certain embodiments of systems and methods herein can also adjust density of pruned interest points allowing an audio matching system to maintain a highly efficient balance between scalability and accuracy.

As discussed in greater detail below, various implementations provide for using intelligent interest point pruning methods to improve audio matching performance for samples suffering from distortion while also maintaining scalability.

Referring initially to FIG. 1 there is illustrated a graphical example of intelligent interest point pruning. At 110, 112, and 114, N types of distortion (N is an integer) are introduced to audio sample 102 creating M distorted audio samples 120, 122, and 124 (M is an integer). For example, the types of distortion can include pitch shifting, time stretching, compression techniques, noise, etc. It can be appreciated that multiple types of distortion can be applied at once as a distortion. It can also be appreciated that certain types of distortion may be more useful for audio samples from certain sources. For example, pitch shifting and time stretching may be particularly useful for audio samples such as tracks played on or through the radio. It can also be appreciated that many types of distortion can be applied at different levels, for example, an audio sample can be pitch shifted by shifting each note up or down in the scale by differing levels. Thus, it can be further appreciated that introducing differing levels of, for example, pitch shifting distortion, into sample 102, can constitute different types of distortion 110, 112, and 114.

P sets of interest points 140, 142, and 144 (P is an integer) can then be generated by interest point detection methods 130. At 150, P sets of interest points 140, 142, and 144 can be merged to determine which interest points are common to the most of the P sets of interest points 140, 142, and 144. Therefore, interest points 150 are identified that most robustly withstand differing types of distortion 110, 112, and 114. Thus, intelligent interest point pruning is accomplished that reduces the amount of interest points necessary in generating a fingerprint while still maintaining robustness to distortion. In one implementation, N=M=P. In other implementations, two of the integers may be the same and the third different. In another implementation, the three integers differ from each other.

Figure 2:
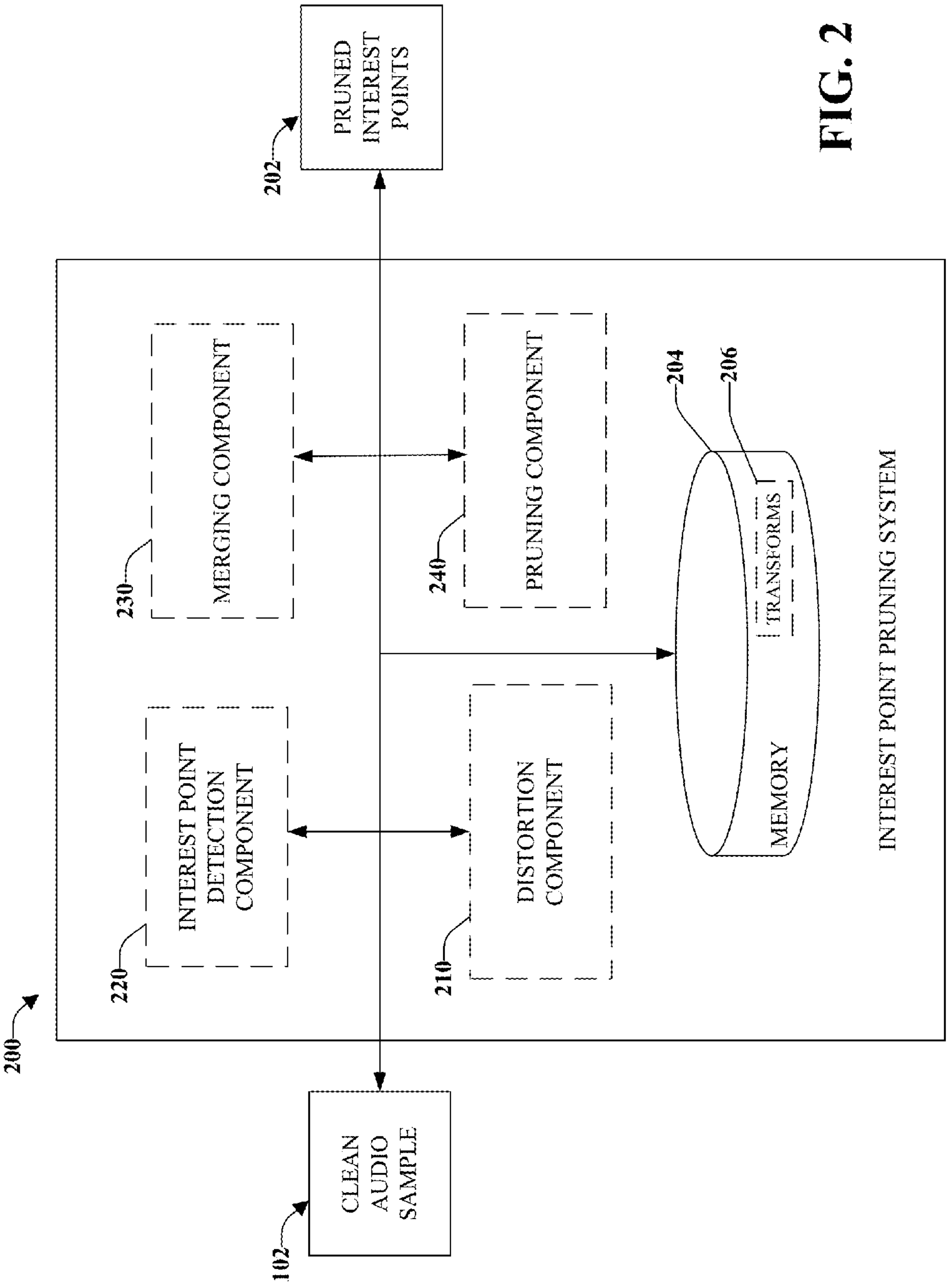
FIG. 2 illustrates a high-level functional block diagram of an example intelligent interest point pruning system.

FIG. 2 illustrates a high level functional block diagram of a non-limiting example interest point pruning system 200. Distortion component 210 can generate a plurality of distorted audio samples based upon clean audio sample 102 and at least one of a type of distortion and an intensity of distortion. It can be appreciated that relevant transforms 206, including codecs, necessary to introduce a type of distortion can be stored in memory 204 and utilized by distortion component 210 to generate the plurality of distorted audio samples.

The type of distortion applied can for example include noise, introducing compression codecs, pitch shifting, time stretching etc. Compression codecs can include, for example, advanced audio coding (AAC), High-Efficiency Advanced Audio Coding (AAC+), Free Lossless Audio Codec (FLAC), MP3, Ogg. RealAudio, Vorbis, Waveform Audio File Format (WAV), and Windows Media Audio (WMA).

An intensity of distortion can be used to adjust intensity of certain types of distortion. For example, an intensity of distortion associated with noise levels can adjust severity of noise introduced into clean audio sample 102. In another example, an intensity of distortion can reflect the level of compression, i.e. reducing the bitrate or increasing the percentage of speedup applied to the clean audio sample. Some types of distortion may not be suitable to adjusting an intensity of distortion. It is to be appreciated that multiple transforms 206 can be stored in memory representing varying levels of intensity of distortion. In one implementation, the intensity of distortion can be determined by user input, predetermined thresholds indicative of utility, or a threshold based upon machine learning.

It can be appreciated, as discussed in more detail below, that using an intensity of distortion that is too high can create distorted audio samples and corresponding sets of distorted interest points that have little overlap with a set of clean interest points. In such an example, too many interest points may be pruned, due to the low amount of overlap, which can prevent accurate identification of audio samples using the overly pruned interest point set. Alternatively, it can be appreciated, as discussed in more detail below, that using an intensity of distortion that is too low can create distorted audio samples and corresponding sets of distorted interest points that overlap nearly completely with a set of clean interest points. In this example, too many interest points may be retained in the set of pruned interest points, which can reduce the benefits of scalability associated with the disclosed systems and methods herein. Therefore, it can be further appreciated that an intensity of distortion based upon a predetermined threshold indicative of utility can seek the most useful balance between accuracy and scalability.

Interest point detection component 220 can generate a plurality of sets of distorted interest points based upon the plurality of distorted audio samples. In one implementation, interest point detection component 220 can further generate a set of clean interest points based upon clean audio sample 102. Merging component 230 can determine an amount of overlap based upon the plurality of sets of distorted interest points. For example, the amount of overlap can represent a percentage of sets of distorted interest points that an individual interest point is present in. In one implementation, merging component 230 can determine amount of overlap for each individual interest point detected by interest point detection component 220.

In one implementation, merging component 230 can reduce and/or remove distortion from a set of distorted interest points prior to determining the amount of overlap. For example, the effects of time-stretching or pitch shifting can be eliminated based upon the intensity with which either type of distortion was applied. It can be appreciated that some sets of distorted interest points are based upon multiple types of distortion being introduced to clean audio sample 102 by distortion component 210.

In another implementation, merging component 230 can determine the amount of overlap further based upon a set of clean interest points. It can be appreciated that merging component 230 can compare the plurality of sets of distorted interest points to the set of clean interest points and determine amount of overlap for strictly the clean interest points.

Pruning component 240 can determine a set of pruned interest points 202 based upon the amount of overlap and an overlap factor. For example, the overlap factor can set a threshold that the amount of overlap must meet to be included in the set of pruned interest points. It can be appreciated that the overlap factor can be determined by a user input, a predetermined threshold indicative of utility and/or machine learning.

It can be appreciated that using an overlap factor that sets the threshold that the amount of overlap must meet as too high may prune too many interest points. In such an example, pruning too many interest points can prevent accurate identification of audio samples when using the overly pruned interest point set for audio matching. Alternatively, it can be appreciated that using an overlap factor that sets the threshold that the amount of overlap must meet as too low may not prune enough interest points. In this example, too many interest points may be retained in the set of pruned interest points, which can reduce the benefits of scalability associated with the disclosed systems and methods herein. Therefore, it can be further appreciated that an overlap factor based upon a predetermined threshold indicative of utility can seek the most useful balance between accuracy and scalability.

Figure 3:
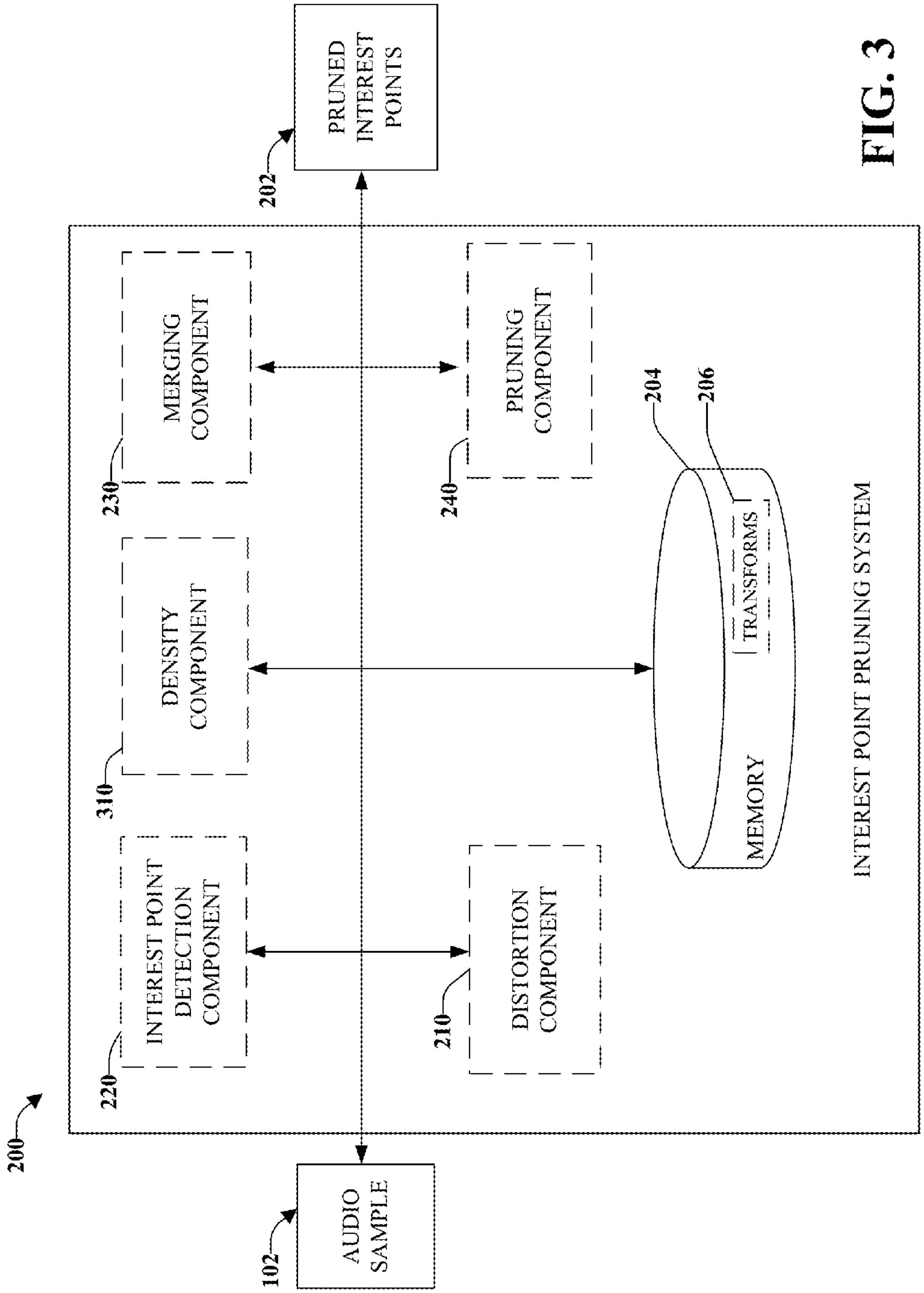
FIG. 3 illustrates a high-level functional block diagram of an example intelligent interest point pruning system adjusting for density.

Referring now to FIG. 3, illustrated is a high-level functional block diagram of intelligent interest point pruning system 200 including density component 310 that can adjust density of the set of pruned interest points based upon desired density. The density can be adjusted to either increase or decrease the amount of interest points in the set of pruned interest points.

In one implementation, the desired density can be determined by at least one of a user input, a predetermined threshold indicative of utility, or a threshold based upon machine learning. For example, in an audio matching system where the set of pruned interest points are used to calculate a fingerprint of a reference sample, the success or failure of the reference fingerprint based upon the set of pruned interest points can be determined. It can be appreciated that repeated successful performance of a certain density of pruned interest points in an audio matching system could lead to reducing the density of pruned interest points to increase scalability. It can be further appreciated that repeated failure of a certain density of pruned interest points in an audio matching system could lead to increasing the density of pruned interest points to improve accuracy. Therefore, it can be further appreciated that the in determining the desired density, systems and methods disclosed herein, can seek the most useful balance between accuracy and scalability.

In one implementation, density component 310 can reduce the density of the set of pruned interest points by at least one of selecting a random subset, increasing the intensity of distortion, or adjusting the overlap factor. It can be appreciated that increasing the intensity of distortion can result in reduction of the amount of overlap. It can be further appreciated that adjusting the overlap factor may raise the amount of overlap threshold required for an interest point to remain in the set of pruned interest points.

In another implementation, density component 310 can increase the density of the set of pruned interest points by at least one of decreasing the intensity of distortion or adjusting the overlap factor. It can be appreciated that decreasing the intensity of distortion can result in an increase in the amount of overlap. It can be further appreciated that adjusting the overlap factor can lower the amount of overlap threshold required for an interest point to remain in the set of pruned interest points.

Figure 4:
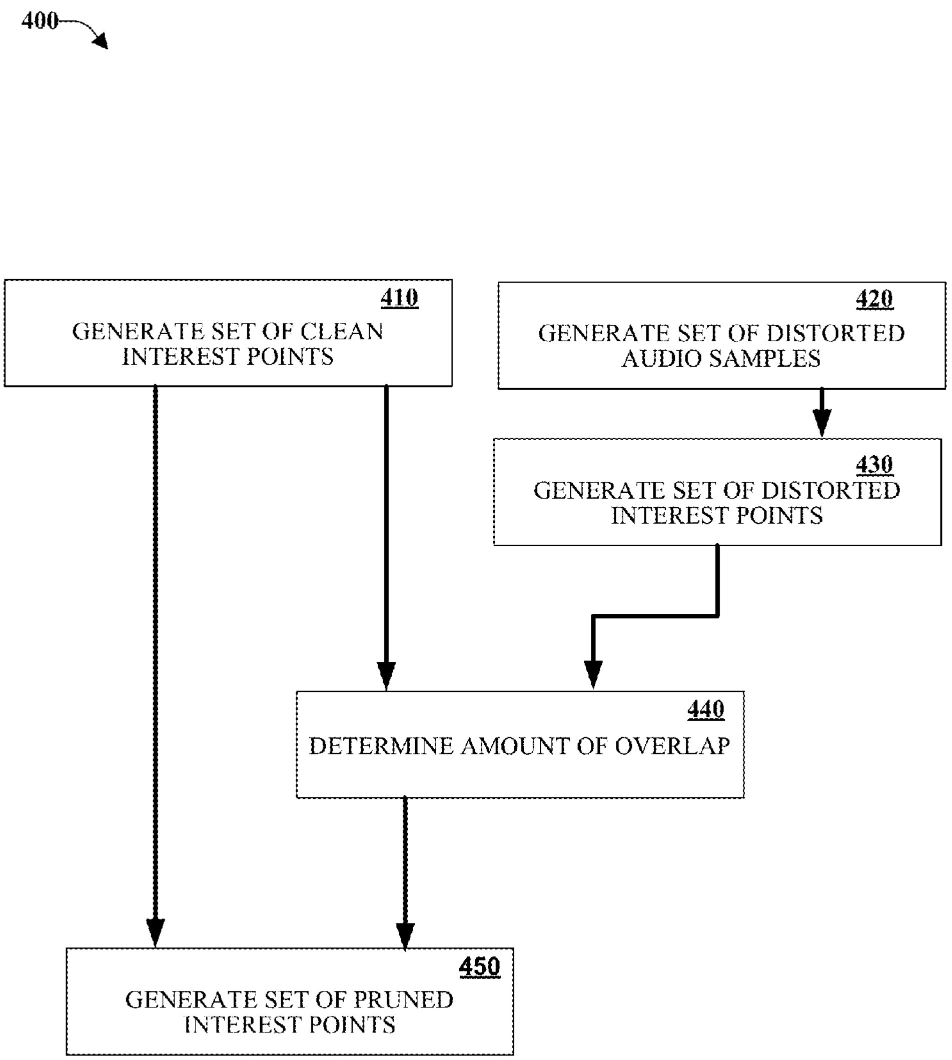
FIG. 4 illustrates an example methodology for intelligent interest point pruning.
Figure 5:
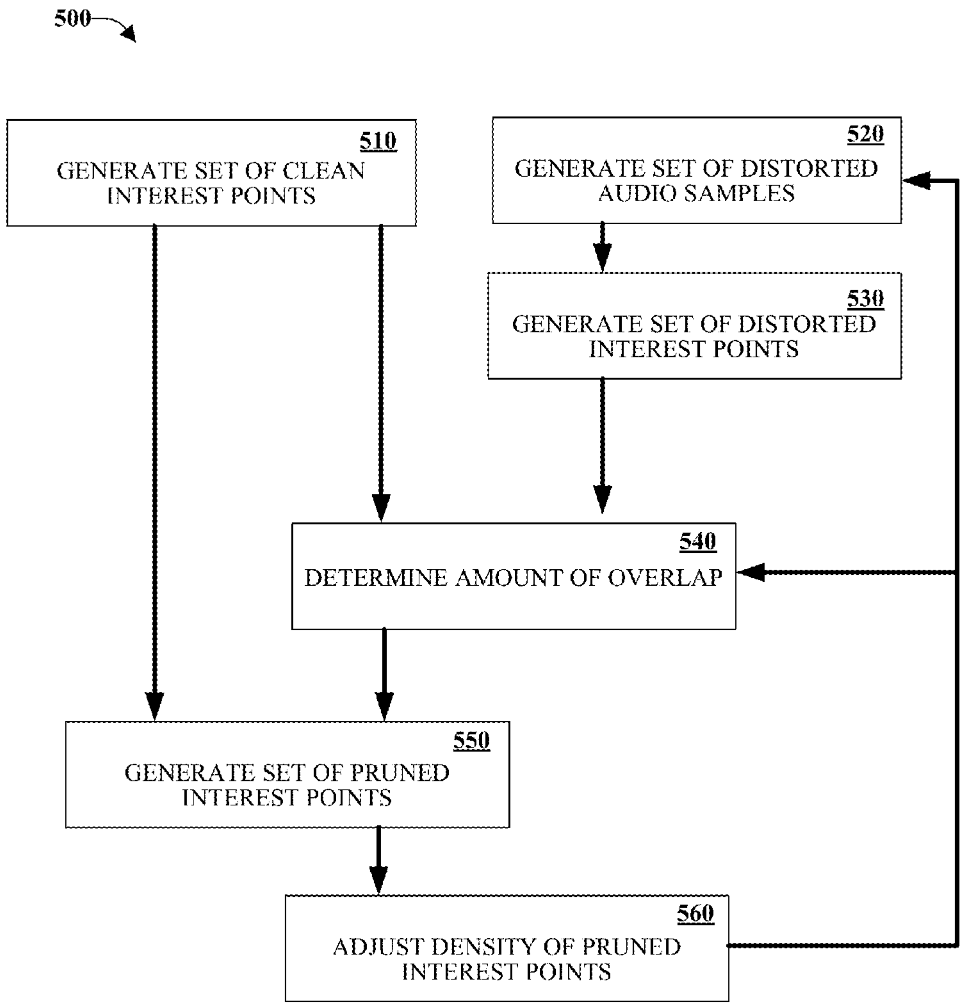
FIG. 5 illustrates an example methodology for intelligent interest point pruning adjusting for density.

FIGS. 4-5 illustrate methodologies and/or flow diagrams in accordance with this disclosure. For simplicity of explanation, the methodologies are depicted and described as a series of acts. However, acts in accordance with this disclosure can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be appreciated that the methodologies disclosed in this specification are capable of being stored on an article of manufacture to facilitate transporting and transferring such methodologies to computing devices. The term article of manufacture, as used herein, is intended to encompass a computer program accessible from any computer-readable device or storage media.

Moreover, various acts have been described in detail above in connection with respective system diagrams. It is to be appreciated that the detailed description of such acts in the prior figures can be and are intended to be implementable in accordance with the following methodologies.

FIG. 4 illustrates an example methodology 400 for intelligent interest point pruning. At 410, a set of clean interest points is generated (e.g., by an interest point detection component 220) based upon a clean audio sample. At 420, a plurality of distorted audio samples are generated (e.g., by a distortion component 210) based upon the clean audio sample and at least one of a type of distortion or an intensity of distortion. It can be appreciated that the intensity of distortion can be based upon at least one of a user input, a predetermined threshold indicative of utility, or a threshold based upon machine learning.

At 430, a plurality of sets of distorted interest points are generated (e.g., by an interest point detection component 220) based upon the plurality of distorted audio samples. At 440, an amount of overlap is determined (e.g., by merging component 230) based upon the set of clean interest points and the plurality of sets of distorted interest points. It can be appreciated that the overlap factor can be determined based upon at least one of a user input, a predetermined threshold indicative of utility, or a threshold based upon machine learning. In one implementation, the method provides for eliminating the type of distortion from a set of distorted interest points prior to determining the amount of overlap. At 450 a set of pruned interest points is generated (e.g., by pruning component 240) based upon the set of clean interest points, the amount of overlap, and a overlap factor.

FIG. 5 illustrates an example methodology 500 for intelligent interest point pruning including adjusting for density. At 510, a set of clean interests points is generated (e.g., by a interest point detection component 220) based upon a clean audio sample. At 520, a plurality of distorted audio samples are generated (e.g., by distortion component 210) based upon a clean audio sample and at least one of a type of distortion or an intensity of distortion. At 530, a plurality of sets of distorted interest points are generated (e.g., by interest point detection component 220) based upon the plurality of distorted audio samples. At 540, an amount of overlap is determined (e.g., by merging component 230) based upon the set of clean interest points and the plurality of sets of distorted interest points. At 550 a set of pruned interest points is generated (e.g., by pruning component 240) based upon the set of clean interest points, the amount of overlap, and an overlap factor.

At 560, the density of the set of pruned interest points can be adjusted (e.g., by density component 310) based upon a desired density. It can be appreciated that the desired density can be at least one of a user input, a predetermined threshold indicative of utility, or a threshold based upon probabilistic machine learning. The density can be adjusted by, for example, selecting a random subset of pruned interest points, adjusting the intensity of distortion, and/or adjusting the overlap factor.

To provide for or aid in the numerous inferences described herein, components described herein can examine the entirety or a subset of data available and can provide for reasoning about or infer states of an audio sample, a system, environment, and/or client device from a set of observations as captured via events and/or data. Inference can be employed to identify a specific context or action, or can generate a probability distribution over states, for example. The inference can be probabilistic—that is, the computation of a probability distribution over states of interest based upon a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier can be a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification are not necessarily all referring to the same implementation. Furthermore, the particular features, structures, or characteristics may be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables hardware to perform specific functions (e.g., generating interest points and/or fingerprints); software on a computer readable medium; or a combination thereof.

The aforementioned systems, circuits, modules, and so on have been described with respect to interaction between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Figure 6:
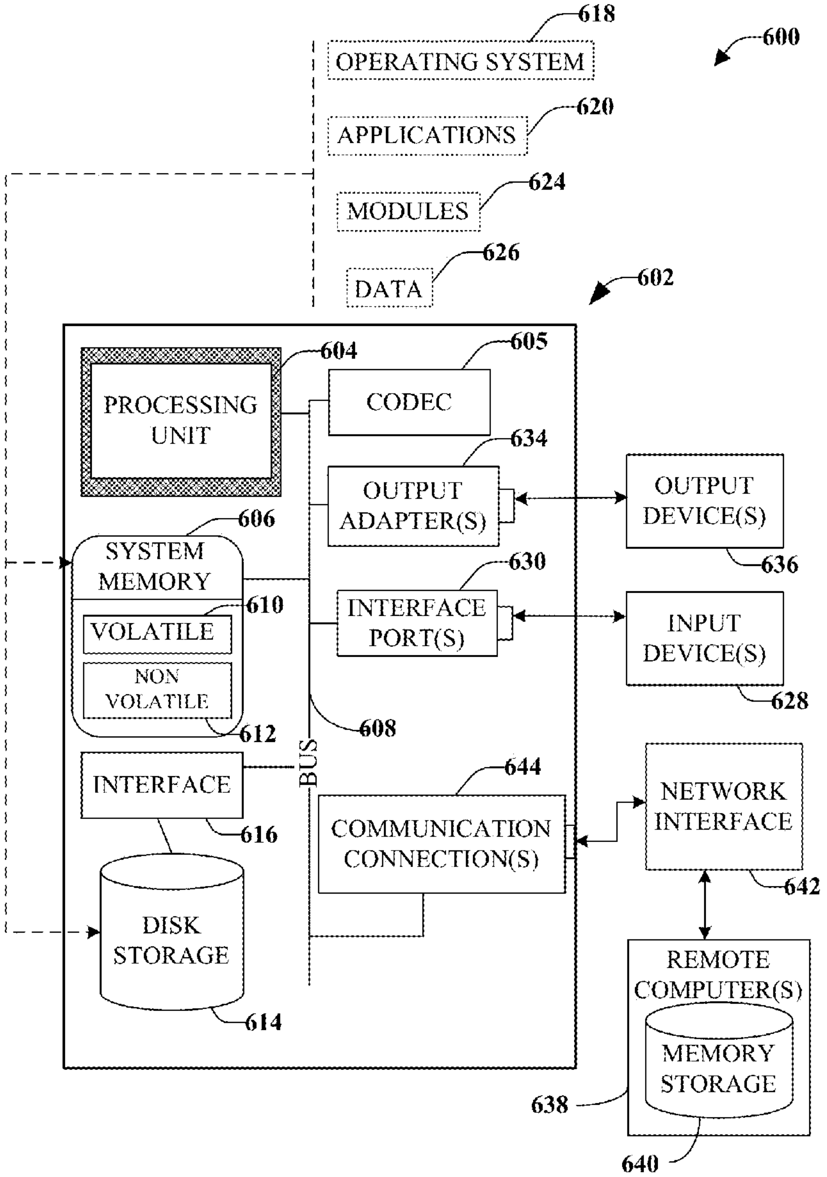
FIG. 6 illustrates an example schematic block diagram for a computing environment in accordance with the subject specification.

With reference to FIG. 6, a suitable environment 600 for implementing various aspects of the claimed subject matter includes a computer 602. The computer 602 includes a processing unit 604, a system memory 606, a codec 605, and a system bus 608. The system bus 608 couples system components including, but not limited to, the system memory 606 to the processing unit 604. The processing unit 604 can be any of various available processors. Dual microprocessors and other multiprocessor architectures also can be employed as the processing unit 604.

The system bus 608 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 606 includes volatile memory 610 and non-volatile memory 612. The basic input/output system (BIOS), containing the basic routines to transfer information between elements within the computer 602, such as during start-up, is stored in non-volatile memory 612. By way of illustration, and not limitation, non-volatile memory 612 can include read only memory (ROM), programmable ROM (PROM), electrically programmable ROM (EPROM), electrically erasable programmable ROM (EEPROM), or flash memory. Volatile memory 610 includes random access memory (RAM), which acts as external cache memory. According to present aspects, the volatile memory may store the write operation retry logic (not shown in FIG. 6) and the like. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM).

Computer 602 may also include removable/non-removable, volatile/non-volatile computer storage media. FIG. 6 illustrates, for example, a disk storage 614. Disk storage 614 includes, but is not limited to, devices like a magnetic disk drive, solid state disk (SSD) floppy disk drive, tape drive, Jaz drive, Zip drive, LS-100 drive, flash memory card, or memory stick. In addition, disk storage 614 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 614 to the system bus 608, a removable or non-removable interface is typically used, such as interface 616.

It is to be appreciated that FIG. 6 describes software that acts as an intermediary between users and the basic computer resources described in the suitable operating environment 600. Such software includes an operating system 618. Operating system 618, which can be stored on disk storage 614, acts to control and allocate resources of the computer system 602. Applications 620 take advantage of the management of resources by operating system 618 through program modules 624, and program data 626, such as the boot/shutdown transaction table and the like, stored either in system memory 606 or on disk storage 614. It is to be appreciated that the claimed subject matter can be implemented with various operating systems or combinations of operating systems.

A user enters commands or information into the computer 602 through input device(s) 628. Input devices 628 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 604 through the system bus 608 via interface port(s) 630. Interface port(s) 630 include, for example, a serial port, a parallel port, a game port, and a universal serial bus (USB). Output device(s) 636 use some of the same type of ports as input device(s) 628. Thus, for example, a USB port may be used to provide input to computer 602, and to output information from computer 602 to an output device 636. Output adapter 634 is provided to illustrate that there are some output devices 636 like monitors, speakers, and printers, among other output devices 636, which require special adapters. The output adapters 634 include, by way of illustration and not limitation, video and sound cards that provide a means of connection between the output device 636 and the system bus 608. It should be noted that other devices and/or systems of devices provide both input and output capabilities such as remote computer(s) 638.

Computer 602 can operate in a networked environment using logical connections to one or more remote computers, such as remote computer(s) 638. The remote computer(s) 638 can be a personal computer, a server, a router, a network PC, a workstation, a microprocessor based appliance, a peer device, a smart phone, a tablet, or other network node, and typically includes many of the elements described relative to computer 602. For purposes of brevity, only a memory storage device 640 is illustrated with remote computer(s) 638. Remote computer(s) 638 is logically connected to computer 602 through a network interface 642 and then connected via communication connection(s) 644. Network interface 642 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like.

WAN technologies include, but are not limited to, point-to-point links, circuit switching networks like Integrated Services Digital Networks (ISDN) and variations thereon, packet switching networks, and Digital Subscriber Lines (DSL).

Communication connection(s) 644 refers to the hardware/software employed to connect the network interface 642 to the bus 608. While communication connection 644 is shown for illustrative clarity inside computer 602, it can also be external to computer 602. The hardware/software necessary for connection to the network interface 642 includes, for exemplary purposes only, internal and external technologies such as, modems including regular telephone grade modems, cable modems and DSL modems, ISDN adapters, and wired and wireless Ethernet cards, hubs, and routers.

Figure 7:
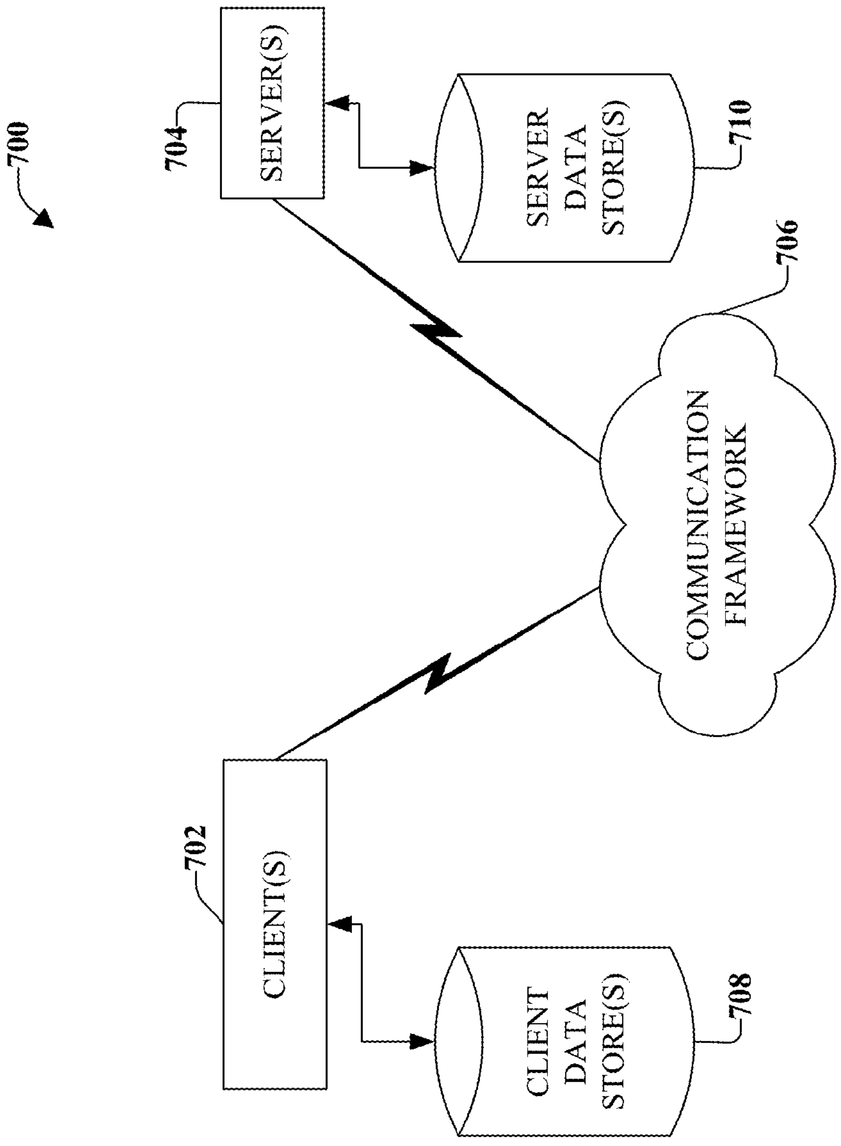
FIG. 7 illustrates an example block diagram of a computer operable to execute the disclosed architecture.

Referring now to FIG. 7, there is illustrated a schematic block diagram of a computing environment 700 in accordance with the subject specification. The system 700 includes one or more client(s) 702, which can include an application or a system that accesses a service on the server 704. The client (s) 702 can be hardware and/or software (e.g., threads, processes, computing devices). The client(s) 702 can house cookie(s), metadata and/or associated contextual information by employing the specification, for example.

The system 700 also includes one or more server(s) 704. The server(s) 704 can also be hardware or hardware in combination with software (e.g., threads, processes, computing devices). The servers 704 can house threads to perform, for example, interest point detection, distorting, merging, pruning, mixing, fingerprint generation, matching score generation, or fingerprint comparisons in accordance with the subject disclosure. One possible communication between a client 702 and a server 704 can be in the form of a data packet adapted to be transmitted between two or more computer processes where the data packet contains, for example, an audio sample. The data packet can include a cookie and/or associated contextual information, for example. The system 700 includes a communication framework 1506 (e.g., a global communication network such as the Internet) that can be employed to facilitate communications between the client(s) 702 and the server(s) 704.

Communications can be facilitated via a wired (including optical fiber) and/or wireless technology. The client(s) 702 are operatively connected to one or more client data store(s) 708 that can be employed to store information local to the client(s) 702 (e.g., cookie(s) and/or associated contextual information). Similarly, the server(s) 704 are operatively connected to one or more server data store(s) 710 that can be employed to store information local to the servers 704.

The illustrated aspects of the disclosure may also be practiced in distributed computing environments where certain tasks are performed by remote processing devices that are linked through a communications network. In a distributed computing environment, program modules can be located in both local and remote memory storage devices.

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

What has been described above includes examples of the implementations of the present invention. It is, of course, not possible to describe every conceivable combination of components or methodologies for purposes of describing the claimed subject matter, but many further combinations and permutations of the subject innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

What is claimed is:

1. A system, comprising:

a processor; and a memory communicatively coupled to the processor, the memory having stored therein computer executable components comprising:

a distortion component that generates a plurality of distorted audio samples based upon a clean audio sample and a plurality of types of distortion;

an interest point detection component that generates a plurality of distorted sets of interest points based upon the plurality of distorted audio samples;

a merging component that determines respective amount of overlap for each interest point of the plurality of distorted sets of interest points, wherein the amount of overlap indicates a percentage of distorted sets of interested points in which an associated interest point is included; and a pruning component that generates a pruned set of interest points comprising interest points having the respective amounts of overlap meeting an overlap factor indicating a threshold amount of overlap for an interest point to be included in the set of pruned interest points.

2. The system of claim 1, wherein the types of distortion include at least one of noise, compression, pitch shifting, or time stretching.

3. The system of claim 1, wherein the overlap factor is determined by at least one of a user input, a predetermined threshold indicative of utility, or a threshold based upon machine learning.

4. The system of claim 1, wherein the distortion component further generates the plurality of distorted audio samples based upon respective intensities of distortion associated with at least one type of distortion, where in the intensities of distortion are determined by at least one of a user input, a predetermined threshold indicative of utility, or a threshold based upon machine learning.

5. The system of claim 1, wherein the merging component further eliminates one type of distortion from a distorted set of interest points prior to determining the respective amounts of overlap.

6. The system of claim 1, further comprising:

a density component that adjusts a density of the set of pruned interest points based upon a desired density.

7. The system of claim 6, wherein the desired density is determined by at least one of a user input, a predetermined threshold indicative of utility, or a threshold based upon probabilistic machine learning.

8. The system of claim 6, wherein the density component reduces the density of the set of pruned interest points by at least one of increasing an intensity of distortion associated with a type of distortion or adjusting the overlap factor.

9. The system of claim 6, wherein the density component increases the density of the set of pruned interest points by at least one of decreasing an intensity of distortion associated with a type of distortion or adjusting the overlap factor.

10. The system of claim 1, wherein the interest point detection component further generates a clean set of interest points based upon the clean audio sample.

11. The system of claim 10, wherein the merging component determines the respective amount of overlap for each interest point further based upon the clean set of interest points, wherein the amount of overlap indicates the percentage of distorted sets of interested points and clean set of interest points in which the associated interest point is included.

12. A method, comprising:

generating, by a device including a processor, a plurality of distorted audio samples based upon a clean audio sample and a plurality of types of distortion;

generating, by the device, a plurality of distorted sets of interest points based upon the plurality of distorted audio samples;

determining, by the device, respective amount of overlap for each interest point of the plurality of distorted sets of interest points, wherein the amount of overlap indicates a percentage of distorted sets of interested points in which an associated interest point is included; and generating, by the device, a pruned set of interest points comprising interest points having the respective amounts of overlap meeting an overlap factor indicating a threshold amount of overlap for an interest point to be included in the set of pruned interest points.

13. The method of claim 12, wherein the types of distortion is at least one of noise, compression, pitch shifting, or time stretching.

14. The method of claim 12, wherein the overlap factor is at least one of a user input, a predetermined threshold indicative of utility, or a threshold based upon machine learning.

15. The method of claim 12, wherein the generating the plurality of distorted audio samples comprises generating the plurality of distorted audio samples further based upon respective intensities of distortion associated with at least one type of distortion, where in the intensities of distortion are at least one of a user input, a predetermined threshold indicative of utility, or a threshold based upon machine learning.

16. The method of claim 12, further comprising:

generating, by the device, a clean set of interest points based upon the clean audio sample;

wherein the determining the respective amount of overlap for each interest point further comprises determining the respective amount of overlap for each interest point further based upon the clean set of interest points, wherein the amount of overlap indicates the percentage of distorted sets of interested points and clean set of interest points in which the associated interest point is included.

17. The method of claim 12, further comprising:

adjusting, by the device, a density of the set of pruned interest points based upon a desired density.

18. The method of claim 17, wherein the desired density is at least one of a user input, a predetermined threshold indicative of utility, or a threshold based upon machine learning.

19. The method of claim 17, wherein the density of the set of pruned interest points is adjusted by at least one of increasing an intensity of distortion associated with a type of distortion or adjusting the overlap factor.

20. The method of claim 17, wherein the adjusting the density of the set of pruned interest points comprises at least one of decreasing an intensity of distortion associated with a type of distortion or adjusting the overlap factor.

21. A system, comprising:

means for generating a plurality of distorted audio samples based upon a clean audio sample and a plurality of types of distortion;

means for generating a plurality of distorted sets of interest points based upon the plurality of distorted audio samples;

means for determining respective amount of overlap for each interest point of the plurality of distorted sets of interest points, wherein the amount of overlap indicates a percentage of distorted sets of interested points in which an associated interest point is included; and means for generating a pruned set of interest points comprising interest points having the respective amounts of overlap meeting an overlap factor indicating a threshold amount of overlap for an interest point to be included in the set of pruned interest points.

22. A non-transitory computer readable medium having instructions stored thereon that, in response to execution, cause a system including a processor to perform operations comprising:

generating a plurality of distorted audio samples based upon a clean audio sample and a plurality of types of distortion;

generating a plurality of distorted sets of interest points based upon the plurality of distorted audio samples;

determining respective amount of overlap for each interest point of the plurality of distorted sets of interest points, wherein the amount of overlap indicates a percentage of distorted sets of interested points in which an associated interest point is included; and generating a pruned set of interest points comprising interest points having the respective amounts of overlap meeting an overlap factor indicating a threshold amount of overlap for an interest point to be included in the set of pruned interest points.

* * * * *